W. E. BENTON.
TOY.
APPLICATION FILED MAY 18, 1920.
1,404,509.   Patented Jan. 24, 1922.
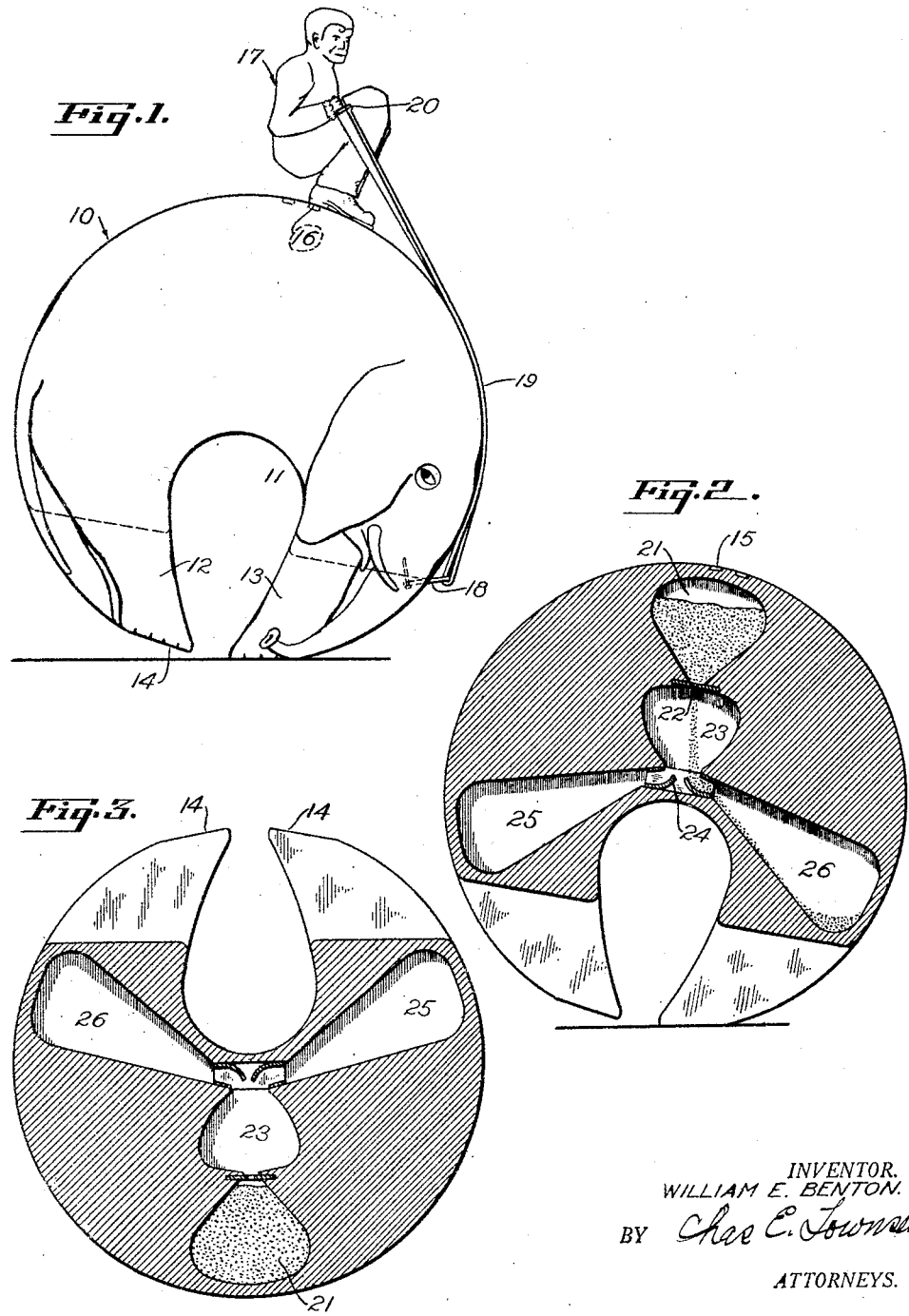
INVENTOR.
WILLIAM E. BENTON.
BY Chas. E. Townsend
ATTORNEYS.

UNITED STATES PATENT OFFICE.

WILLIAM E. BENTON, OF SAN FRANCISCO, CALIFORNIA.

TOY.

1,404,509.　　　　Specification of Letters Patent.　Patented Jan. 24, 1922.

Application filed May 18, 1920. Serial No. 382,298.

*To all whom it may concern:*

Be it known that I, WILLIAM E. BENTON, a citizen of the United States, residing at the city and county of San Francisco and State of California, have invented a new and useful Improvement in Toys, of which the following is a specification.

This invention relates to a mechanical toy.

It is the principal object of the present invention to provide a mechanical toy which is made to resemble an animal or some other animated figure upon which a rider is mounted, said toy being so constructed as to gradually overturn and throw the rider, causing amusement, and at the same time producing considerable curiosity as to the manner of operation.

The present invention contemplates the use of a disk-shaped member, the sides of which are painted to resemble an animal; the disk being further provided with means for receiving a manikin in a position to appear as though riding the animal, said manikin being thrown from the disk by the rolling action thereof.

The invention is illustrated by way of example in the accompanying drawing, in which—

Fig. 1 is a view in side elevation showing the present invention in position to tip and throw the manikin.

Fig. 2 is a view in central section through the disk member showing the sand compartments and the manner in which the weight of the disk is displaced to cause it to roll.

Fig. 3 is a view similar to that shown in Fig. 2, showing the disk in an inverted position and held by the weight of the sand.

Referring more particularly to the drawing, 10 indicates a disk, forming the main portion of the present toy and which for convenience will be hereinafter called the animal. This disk is substantially circular and may be of any desired thickness. The opposite sides of the disk are preferably painted to represent an animal, and in order to make the appearance more life-like, a recess 11 is cut from the disk, thereby forming an accentuated crescent member, the downturned horns 12 and 13 of which represent the front and rear feet of the animal. The circumference of the disk adjacent the horns is slightly cut away to form two short flat faces 14, upon which the disk may temporarily stand, for a purpose to be hereinafter set forth.

The horns of the disk are further cut away, thus forming four legs, although this feature of the invention is not essential. Arranged around the circumference of the disk and upon the opposite side from the horns 12 and 13 is a plurality of small recesses 15 adapted to receive a projecting stud 16 formed integral with the bottom of a manikin 17. This figure is intended to appear as though riding the animal and it is one of the objects of this invention to mount the figure in such a manner as to cause it to be thrown from the animal when the disk is overturned. A fastening member 18 is secured to the edge of the disk, at a point some distance from the series of recesses 16. This fastener carries a resilient band or spring 19 which may be brought to temporarily engage the manikin 17 and to hold the manikin in its seated position. In order to bring this about the loop portion 20 passes over some projection upon the manikin and rests in such a manner as to be instantly disengaged therefrom when the animal overturns, at the same time giving the manikin a flipping action which will throw it a considerable distance from the animal.

One of the important features of the present invention is to provide automatic means whereby the manikin will in a given length of time gradually overturn in a mysterious manner and after overturning will come to rest with the animal lying upon its back and the manikin thrown therefrom. This is brought about by the formation of a plurality of counter-balanced reservoirs within the disk 10 and adapted to permit a circulation of sand or other similar material by which the disk will be thrown off center in one instance and caused to come to rest upon center in the other instance. The arrangement of the compartments when throwing the disk out of balance is clearly shown in Fig. 2, while the relation of the compartments when bringing the disk to rest is shown in Fig. 3. This circulatory system comprises a central sand reservoir 21 formed along a transverse center line of the disk, passing through the center of the cut away portion 11. A restricted opening 22 establishes communication between the reservoir 21 and an intermediate compartment 23. This compartment has an outline throat substantially at the center of the disk. A baffle member 24 is mounted in this throat and has a crest portion extending upwardly into the center thereof, so as to permit the sand to be deflected from the throat and into either of the over-balancing compartments 25 and 26. These compartments extend oppositely from the vertical center of the disk and downwardly into the horns of the disk. The passage-way formed between the baffle member 24 and the throat of the compartment 23, is such as to permit the sand to clog in the throat and prevent a flow into either of the over-balancing compartments 25 when the disk is directly resting on both of its horns 12 and 13. However by rotating the disk so that it will rest in either of the faces 14, the flow of sand will be established into one of the compartments 26 and will continue until the weight of sand has over-balanced the disk and caused it to roll on its circumferential edge. A reversal of the disk to dispose the reservoir 21 lowermost will cause the sand to gradually settle in this reservoir and bring the disk to rest with the horns 12 and 13 extending upwardly.

In operation of the present invention the manikin is seated upon the back of the animal with the projecting member 16 in register with one of the recesses 15. The manikin is then set by passing the loop 20 of the elastic member 19 over a projection thereon. In the present instance the loop is passed over the knees of the manikin and the figure is painted to appear as though the elastic member were reins, by which he guided the animal. The animal is then brought to rest with both horns of the crescent upon a plane surface. When operation is desired the animal is tipped so that the disk will rest on one of the faces 14. In the present instance the face of the horn 13 is selected. Instantly the throat of compartment 23 will be unclogged and the sand flowing from the reservoir 21 is deflected by the baffle plate 24 into the over-balancing compartment 26. The sand will continue to flow through the opening 22 and will find its way into the compartment 26 until the weight of the sand is sufficient to over-balance the disk, at which time it will roll on its circumference until the manikin strikes the plane surface, when it will be tripped and thrown from the animal by the tension of the elastic member 19. The animal will substantially complete a half rotation and after rolling back and forth a short distance will come to rest with the feet of the animal extending uppermost. This result is brought about by the reverse flow of the sand through compartment 23 into the central reservoir 21.

It will thus be seen that a very simple and inexpensive toy can be made in the manner here disclosed and that considerable curiosity will be produced, as well as amusement afforded, by the operation thereof.

While I have shown the preferred form of my invention as now known to me, I wish it understood that various changes in the construction, combination and arrangement of parts may be made by those skilled in the art without departing from the spirit of the invention as claimed.

Having thus described my invention, what I claim and desire to secure by Letters Patent is—

1. A toy comprising a substantially circular disk having a flat face at a point on its circumference to support the disk at equilibrium, and flat faces adjacent thereto, a quantity of mobile substance contained within said disc, and means for creating a flow of said material within the disk to gradually change the center of gravity of the disc and cause it to rotate on its circumference.

2. A toy comprising a disk having three adjacent planes along its periphery upon which the disk may stand without rotation, circulating passage ways within the disc for a mobile material, one passage-way in vertical alignment with the central point, and two passage-ways extending oppositely therefrom, and outwardly over the outer edges of the end planes, whereby a rotation of the disk from its central point to cause it to stand upon one of the end planes will direct the material from the central passage way to the side passage way complementary to the supporting plane, and will gradually act to throw the disk out of equilibrium and cause it to roll.

3. A toy comprising a disk adapted to roll upon a plane surface and having its periphery so formed as to cause it to stand at rest at one of three adjacent points therealong, a passage way for a mobile substance within the disk and in vertical alignment with the central supporting point and the axis of the disk, and a pair of outwardly and downwardly extending sand passageways communicating with said vertical passageway whereby the support of the disk on either of said side points will create a flow of the mobile substance into the complementary side passage way, and will after a definite period of time cause rotation of the disk.

4. A toy comprising a disk adapted to roll upon a plane surface and having its periphery so formed as to cause it to stand at rest at one of three adjacent points therealong, a passage way for a mobile substance within the disk and in vertical alignment with the central supporting point and the axis of the disk, and a pair of outwardly and downwardly extending passage ways communicating with said vertical passage way whereby the support of the disk on either of said side points will create a flow of the mobile material into the complementary side passageway, and after a definite period of time cause rotation of the disk, and means for preventing the flow of same from the vertical passageway to either of the side passageways as long as the disk stands on its central point of support.

5. A toy comprising a disk adapted to roll upon a plane surface and having its periphery so formed as to cause it to stand at rest at one of three adjacent points therealong, a sand passageway within the disk in vertical alignment with the central supporting point and the axis of the disk, a pair of outwardly and downwardly extending sand passageways communicating with said vertical passageway whereby the support of the disk on either of said side points will create a flow of sand into the complementary side passageway, and after a definite period of time cause rotation of the disk, means for preventing the flow of same from the vertical passageway to either of the side passageways as long as the disk stands on its central point of support, and means for definitely regulating the flow of same from said vertical passageway.

6. A toy comprising a circular member adapted to roll along a plane surface; a manikin; means for detachably positioning said manikin upon the surface of said member; and means for temporarily holding the manikin in said position, said means acting to throw the manikin from its seat when the circular member has rolled over to cause the manikin to strike the plane surface.

In testimony whereof I have hereunto set my hand in the presence of two subscribing witnesses.

WILLIAM E. BENTON.

Witnesses:
CLARK BROWN,
HENRY MAYERS.